US009126658B1

(12) United States Patent
Ryan et al.

(10) Patent No.: US 9,126,658 B1
(45) Date of Patent: Sep. 8, 2015

(54) GEAR RESCUE SYSTEM

(71) Applicants: Richard Burns Ryan, Mukilteo, WA (US); Dillon Alexander Novak, Gurnee, IL (US); Shannon Maureen Winters, Stanford, CA (US)

(72) Inventors: Richard Burns Ryan, Mukilteo, WA (US); Dillon Alexander Novak, Gurnee, IL (US); Shannon Maureen Winters, Stanford, CA (US)

( * ) Notice: Subject to any disclaimer, the term of this patent is extended or adjusted under 35 U.S.C. 154(b) by 0 days.

(21) Appl. No.: 14/477,011

(22) Filed: Sep. 4, 2014

Related U.S. Application Data

(60) Provisional application No. 61/873,487, filed on Sep. 4, 2013.

(51) Int. Cl.
*B63B 22/14* (2006.01)
*B63B 22/08* (2006.01)
*A01K 69/08* (2006.01)
*A01K 75/04* (2006.01)

(52) U.S. Cl.
CPC ............... *B63B 22/08* (2013.01); *A01K 69/08* (2013.01); *A01K 75/04* (2013.01)

(58) Field of Classification Search
USPC .......................................... 441/10, 113, 112
IPC ................................. B63C 9/155; B63B 22/14
See application file for complete search history.

(56) References Cited

U.S. PATENT DOCUMENTS

| 4,560,356 | A | * | 12/1985 | Burr | 441/80 |
| 5,518,430 | A | * | 5/1996 | Crowder et al. | 441/93 |
| 6,899,583 | B2 | * | 5/2005 | Barden | 441/89 |
| 2004/0033740 | A1 | * | 2/2004 | Jones | 441/122 |
| 2012/0171911 | A1 | * | 7/2012 | Pisor | 441/12 |

FOREIGN PATENT DOCUMENTS

WO    WO 91/16233    * 10/1991

* cited by examiner

*Primary Examiner* — Stephen Avila
(74) *Attorney, Agent, or Firm* — Plager Schack LLP

(57) ABSTRACT

A gear rescue system is configured to attach to gear in water and to deploy when a deployment water pressure is reached. The gear rescue system includes an upper housing mechanically coupled to a lower housing and an upper cap. A line spool is housed within the upper housing with some line extending through the lower housing and attached to a locking attachment ring. The locking attachment ring is attached to the gear. A blow out plug is detachably coupled to the lower housing and configured to blow out when the deployment water pressure is reached. When he gear pulls the gear rescue system to the deployment water pressure, the blow out plug enters into the lower housing causing the line spool to deploy line enabling the gear rescue system to rise to a surface of the water.

7 Claims, 5 Drawing Sheets

US 9,126,658 B1

GEAR RESCUE SYSTEM

RELATED APPLICATION

This application claims priority to provisional patent application U.S. Ser. No. 61/873,487 filed on Sep. 4, 2013, the entire contents of which is herein incorporated by reference.

BACKGROUND

The embodiments herein relate generally to devices that prevent any type marine gear such as crab, shrimp or lobster pots, fishing gear to include gill or drift nets, and so on from becoming derelict.

Prior to embodiments of the disclosed invention, in the normal course of setting shrimp, crab or lobster pots; tides, wind, current or improper line length move pots to deeper water where the weight of the pots pull down the float or buoy and become lost derelict pots. This becomes a hazard trapping and killing all forms of sea life. Embodiments of the disclosed invention solve these problems.

SUMMARY

A gear rescue system is configured to attach to gear in water and to deploy when a deployment water pressure is reached. The gear rescue system includes an upper housing containing foam float material and a spool of high strength line mechanically coupled to a lower housing. A line spool is housed within the upper housing with some line extending through the lower housing and attached to a locking attachment ring. The locking attachment ring is attached to the gear. A blow out plug is detachably coupled to the lower housing and configured to blow out when the deployment water pressure is reached. The gear pulls the gear rescue system to the deployment water pressure the blow out plug enters into the lower housing causing the line spool to deploy line enabling the gear rescue system to rise to a surface of the water.

In some embodiments, there can be upper housing chamber threads on the upper housing into which a water tight threaded foam cap can be attached. The upper housing chamber threads can be joined to the upper water tight threaded foam cap to directly attach the upper housing to the upper cap.

In some embodiments, an upper housing base can be attached to the upper housing and further comprise a line access. In some embodiments, a lower housing base can be mechanically coupled to the lower housing and further comprise a lower housing blow out plug receiver. The lower housing blow out plug receiver can contain the blow out plug.

In some embodiments an O-ring can be inserted between the blow out plug and the lower housing blow out plug receiver. The O-ring increases a coefficient of static friction between the blow out plug and the lower housing blow out plug receiver. In some embodiments, a spring cord can connect the blow out plug to the lower housing. In some embodiments, a spool line resistance membrane made from extruded expandable material encapsulates the line to keep it from tangling as it spools out and provides resistance to keep the gear rescue system from drifting from the gear.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
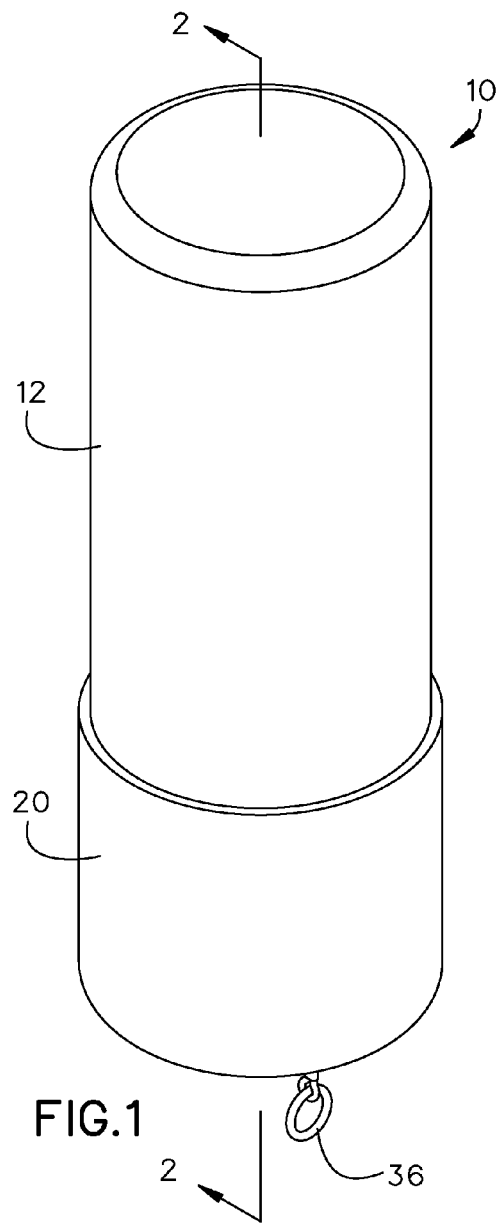
FIG. 1 is a perspective view of an embodiment of the invention.
Figure 2:
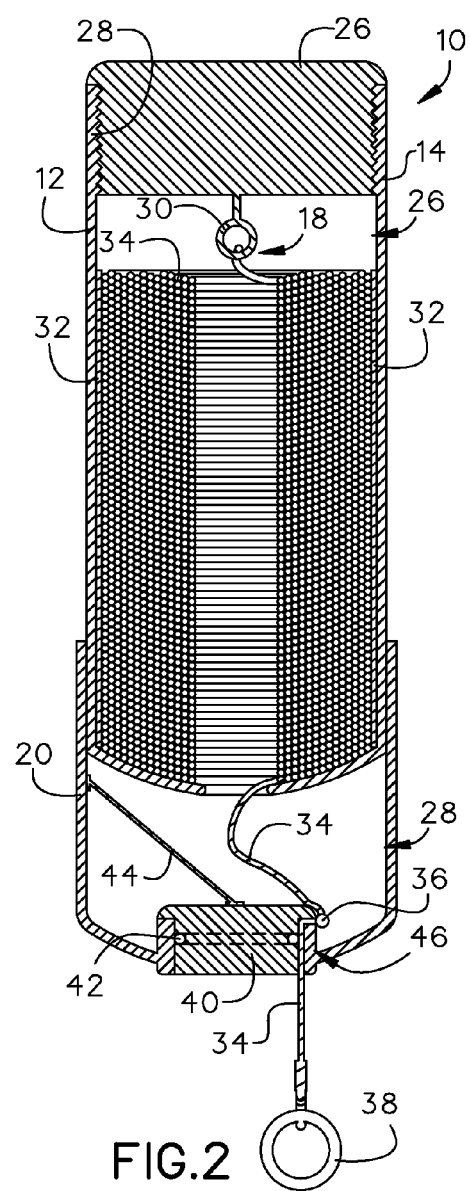
FIG. 2 is a section view of an embodiment of the invention along line 2-2 in FIG. 1.
Figure 3:
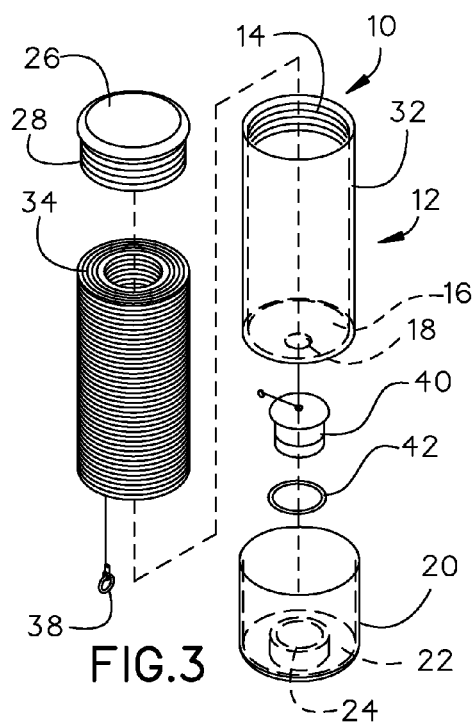
FIG. 3 is an exploded view of an embodiment of the invention.

By way of example, and referring to FIG. 1, FIG. 2 and FIG. 3 one embodiment of gear rescue system 10 comprises upper housing 12 mechanically coupled to lower housing 20 and upper cap 26. Upper housing 12 should be made from a waterproof impact resistant material and further comprises upper housing threads 14 and upper housing base 16. Upper housing base 16 further comprises line access point 18.

Like upper housing 12, lower housing 20 should be made of a waterproof impact resistant material. Lower housing 20 further comprises lower housing base 22 and lower housing blow out plug receiver 24.

Upper cap 26 further comprises upper cap upper housing threads 28. Upper cap 26 should be filled with a buoyant material, such as foam. A user can combine upper cap upper housing threads 28 with upper housing cap threads 14 to join upper cap 26 to upper housing 12. Upper cap 26 is mechanically coupled to spool line attachment 30.

The spool line in upper housing 12 is encased with an extruded line resistance membrane 32 which can be made from an extrusion die. Line spool 34 encased with an extruded line resistance membrane 32 rests inside upper housing 12 upon upper housing base 16 such that a first end of line spool 34 is mechanically coupled to spool line attachment 30 and a second end of line spool 34 extends through line access point 18. The second end is mechanically coupled to interference ball 36 and locking attachment ring 38.

Blow out plug 40 is inserted into lower housing blow out plug receiver 24 with O-ring 42. Blow out plug 40 is mechanically coupled to lower housing 20 with spring cord 44. O-ring 42 traps line spool 34 in lower housing blow out plug receiver 24 at stop point 46.

Figure 4:
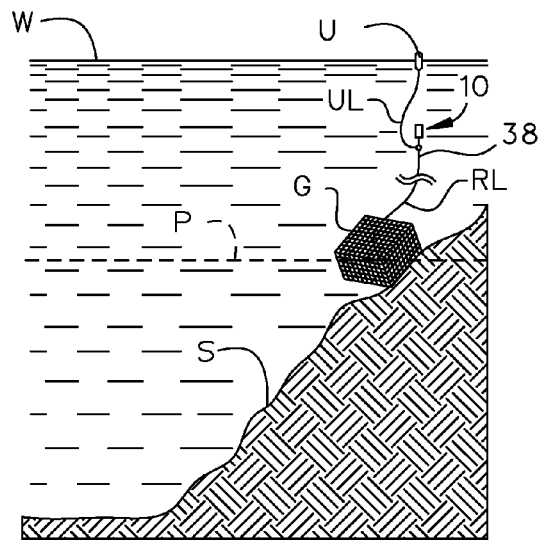
FIG. 4 is a schematic view demonstrating an embodiment of the invention in use in non-active state.
Figure 5:
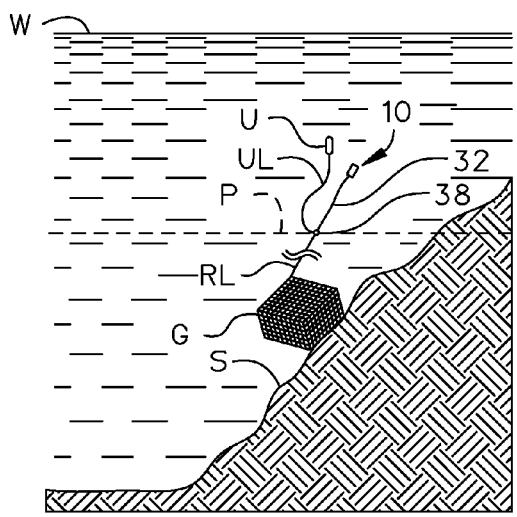
FIG. 5 is a schematic view demonstrating an embodiment of the invention in use at activation state.
Figure 6:
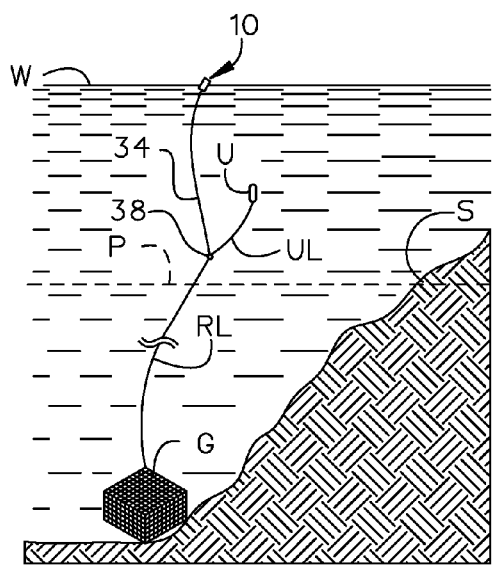
FIG. 6 is a schematic view demonstrating an embodiment of the invention in recovery state.
Figure 7:
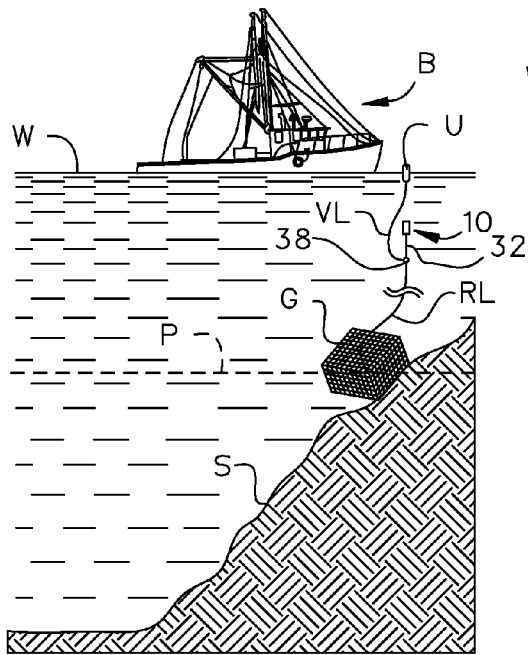
FIG. 7 is a schematic view demonstrating an embodiment of the invention in active state with vessel.
Figure 8:
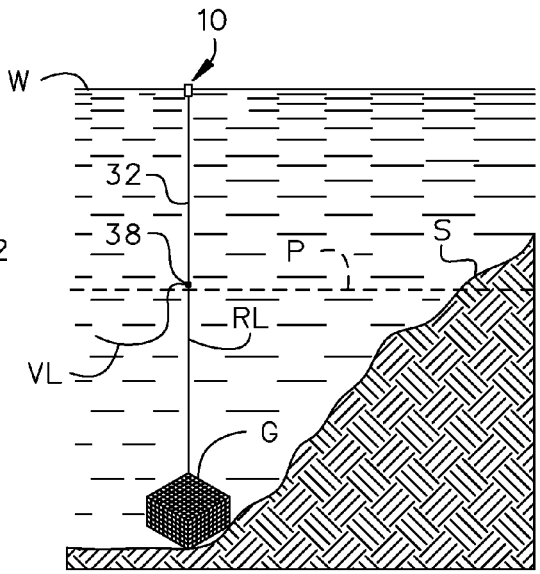
FIG. 8 is a schematic view demonstrating an embodiment of the invention recovery after vessel interference.

In FIG. 4, FIG. 5, and FIG. 6 recovery is demonstrated where wind, tide or improper line length sink gear G. In FIG. 7 and FIG. 8 recovery is demonstrated where boat B runs over and destroys buoy U severing buoy U from buoy attachment line UL. Water W has a surface upon which boat B travels. Gear G can be any known marine gear, through the figures show the example of a crab, shrimp, or lobster pots. Gear G further comprises gear ring line RL, which is mechanically coupled to locking attachment ring 38. Locking attachment ring 38 is mechanically coupled to buoy U with buoy attachment line UL.

In normal operation, a fisher deploys gear G and then returns to get it by grabbing buoy U and then pulling gear G up by buoy line UL. However, if gear G were to become derelict by sliding down seabed S, buoy U would be pulled under water W and gear G could not be easily recovered. Other than generating needless cost, research indicates that derelict gear G can be a hazard to marine life. Embodiments of gear rescue system 10 solve this problem by deploying when gear rescue system 10 falls below pressure line P.

Figure 9:
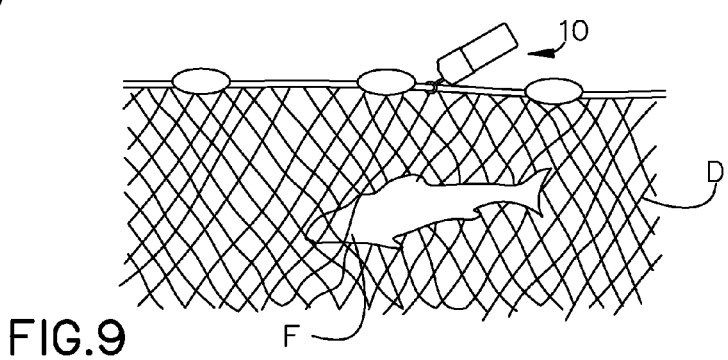
FIG. 9 is a schematic view demonstrating of an embodiment of the invention with a fishing net.
Figure 10:
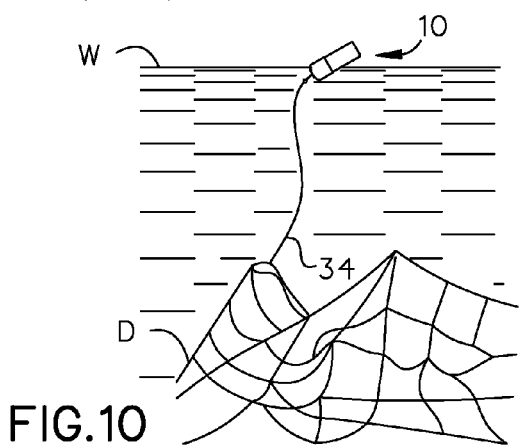
FIG. 10 is a schematic view demonstrating of an embodiment of the invention in recovery state for nets.
Figure 11:
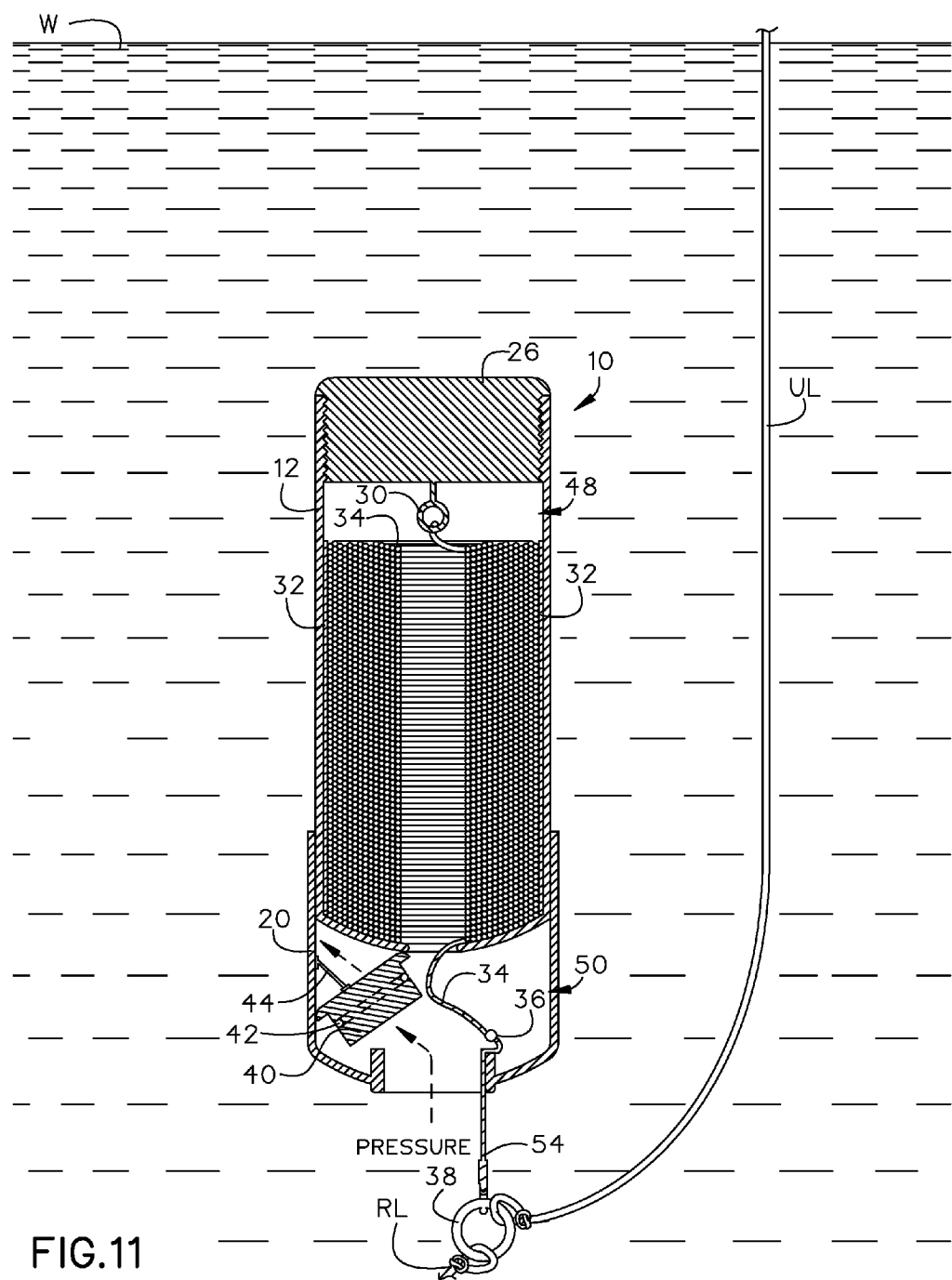
FIG. 11 is a section view of an embodiment of the invention demonstrated in use at activation state.
Figure 12:
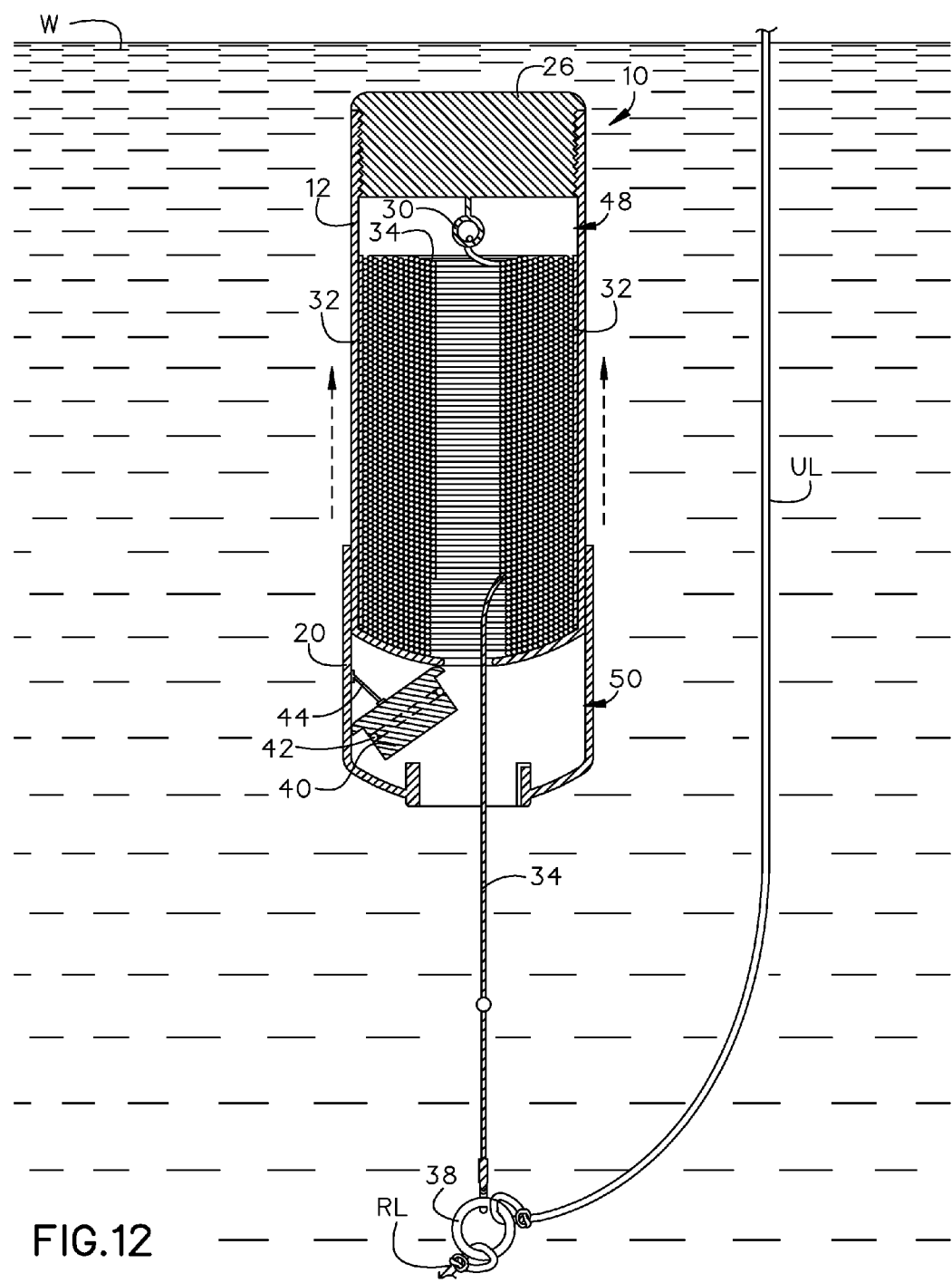
FIG. 12 is a section view of an embodiment of the invention demonstrated in use in active state.

There can be many reasons for this including, as shown in FIG. 7 and FIG. 8, boat B severs buoy U from buoy line UL. As shown in FIG. 9 and FIG. 10, sometimes gear rescue system 10 can be attached to drift or gill nets D. Here, bycatch fish F is tangled in drift or gill net D and drags it beneath water W. This can be an environmental hazard that is mitigated when gear rescue system 10 is deployed to facilitate location and removal of nets Hydrostatics indicate that as one travels further below water pressure increases based on the specific gravity of the water. As shown in FIG. 11 and FIG. 12, when the pressure exceeds the coefficient of static friction caused between lower housing blow out plug receiver 24 and O-ring 42. A user can adjust this deployment water pressure by selecting a thicker or thinner O-ring 42. There are other ways to adjust the deployment pressure including: permitting an upper air pocket 48 to form between upper housing 12 and upper plug 26; permitting a lower air pocket 50 to form between lower housing 20 and blow out plug 40. In some embodiments air can be pressurized to further increase buoyancy.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A gear rescue system, configured to attach to gear in water and to deploy when a deployment water pressure is reached; the gear rescue system comprising:

an upper housing mechanically coupled to a lower housing and an upper water tight cap;

a line spool housed within the upper housing with some line extending through the lower housing and attached to a locking attachment ring; wherein the locking attachment ring is attached to the gear;

a blow out plug detachably coupled to the lower housing and configured to blow out when the deployment water pressure is reached;

wherein the gear pulls the gear rescue system to the deployment water pressure the blow out plug enters into the lower housing causing the line spool to deploy line enabling the gear rescue system to rise to a surface of the water.

2. The gear rescue system of claim 1, further comprising: an O-ring, inserted between the blow out plug and the lower housing blow out plug receiver; wherein the O-ring increases a coefficient of static friction between the blow out plug and the lower housing blow out plug receiver.

3. The gear rescue system of claim 2, further comprising: an upper housing base attached to the upper housing and further comprising a line access.

4. The gear rescue system of claim 3, further comprising: a lower housing base mechanically coupled to the lower housing and further comprising a lower housing blow out plug receiver;

wherein the lower housing blow out plug receiver contains the blow out plug.

5. The gear rescue system of claim 4, further comprising a spool line resistance membrane that keeps the line from tangling as it spools out and provides resistance to keep the gear rescue system from drifting from the gear.

6. The gear rescue system of claim 5, further comprising: a spring cord further connecting the blow out plug to the lower housing.

7. The gear rescue system of claim 1, further comprising: upper housing cap threads on the upper housing;
upper cap upper housing threads on the upper cap;
wherein the upper housing cap threads are joined to the upper cap upper housing threads to directly attach the upper housing to the upper cap.

* * * * *